United States Patent
Chitnis et al.

(10) Patent No.: US 12,292,967 B2
(45) Date of Patent: *May 6, 2025

(54) METHOD AND SYSTEM FOR FREEDOM FROM INTERFERENCE (FFI)

(71) Applicant: TEXAS INSTRUMENTS INCORPORATED, Dallas, TX (US)

(72) Inventors: Kedar Satish Chitnis, Bengaluru (IN); Mihir Narendra Mody, Bengaluru (IN); Amritpal Singh Mundra, Allen, TX (US); Yashwant Dutt, Bengaluru (IN); Gregory Raymond Shurtz, Houston, TX (US); Robert John Tivy, Ojai, CA (US); Santhanakrishnan Badri Narayanan, Bangalore (IN); Prithvi Shankar Yeyyadi Anantha, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/662,227

(22) Filed: May 13, 2024

(65) Prior Publication Data
US 2024/0296220 A1    Sep. 5, 2024

Related U.S. Application Data

(63) Continuation of application No. 17/550,948, filed on Dec. 14, 2021, now Pat. No. 12,013,931.

(51) Int. Cl.
*G06F 21/54* (2013.01)
*G06F 9/48* (2006.01)
*G06F 21/55* (2013.01)
*G06F 21/79* (2013.01)

(52) U.S. Cl.
CPC .............. *G06F 21/54* (2013.01); *G06F 9/485* (2013.01); *G06F 21/554* (2013.01); *G06F 21/79* (2013.01)

(58) Field of Classification Search
CPC ........ G06F 21/54; G06F 9/485; G06F 21/554; G06F 21/79
USPC ....................................................... 726/26
See application file for complete search history.

(56) References Cited

U.S. PATENT DOCUMENTS

| 6,745,274 | B1 | 6/2004 | Synder |
| 6,779,072 | B1 | 8/2004 | Sauder |
| 6,970,963 | B2 | 11/2005 | Synder |
| 8,307,416 | B2 * | 11/2012 | Conti ................. G06F 12/1483 711/158 |

(Continued)

*Primary Examiner* — Sargon N Nano
(74) *Attorney, Agent, or Firm* — Michael T. Gabrik; Frank D. Cimino

(57) ABSTRACT

Devices, systems and techniques for implementing freedom from interference (FFI) access rules. In an example, a device includes a set of primary components, a set of secondary components, and an interconnected coupled between the two sets of components. Each primary component of the set of primary components has an access identifier, among multiple access attributes, and an access attribute, among multiple access modes. Each secondary component of the set of secondary components is protected by a firewall. Each firewall is configured to specify, for each specific combination of an access identifier and access attribute, whether access to the associated secondary component is permitted and what type of access is permitted.

20 Claims, 7 Drawing Sheets

(56) References Cited

U.S. PATENT DOCUMENTS

| | | | | |
|---|---|---|---|---|
| 9,489,332 | B2 * | 11/2016 | Chavali | G06F 13/1605 |
| 9,836,318 | B2 * | 12/2017 | Brewerton | G06F 9/30043 |
| 11,210,095 | B2 | 12/2021 | Hansen | |
| 11,212,095 | B2 * | 12/2021 | Brickell | H04W 12/04 |
| 11,656,905 | B2 | 5/2023 | Rosemarine | |
| 2010/0057400 | A1 | 3/2010 | Chou | |
| 2011/0010720 | A1 * | 1/2011 | Smith | G06F 21/00 |
| | | | | 712/E9.016 |
| 2011/0093750 | A1 * | 4/2011 | Williams | G06F 9/5077 |
| | | | | 718/1 |
| 2013/0086385 | A1 * | 4/2013 | Poeluev | H04L 9/0838 |
| | | | | 726/19 |
| 2014/0298408 | A1 * | 10/2014 | Sastry | G06F 12/1458 |
| | | | | 726/1 |
| 2015/0242233 | A1 * | 8/2015 | Brewerton | G06F 13/28 |
| | | | | 710/308 |
| 2019/0049914 | A1 * | 2/2019 | Munafo | G07C 5/0816 |
| 2021/0119780 | A1 * | 4/2021 | Hassan | H04L 9/088 |
| 2021/0334018 | A1 * | 10/2021 | Geng | G06F 21/74 |

* cited by examiner

METHOD AND SYSTEM FOR FREEDOM FROM INTERFERENCE (FFI)

CROSS-REFERENCE TO RELATED APPLICATION(S)

This application is a continuation of, and claims priority to, U.S. application Ser. No. 17/550,948, filed Dec. 14, 2021, the content of which is incorporated by reference herein in its entirety.

BACKGROUND

Increasingly, computerized systems (e.g., Systems on a Chip, or "SoCs") are becoming more complex, with multiple general-purpose processors (e.g., central processing units or "CPUs"), specialized hardware to accelerate the performance of particular tasks (e.g., Graphics Processing Units (GPUs), Field-Programmable Gate Arrays (FPGAs), Application-Specific Integrated Circuits (ASICs), Complex Programmable Logic Devices (CPLDs), etc.), direct memory access (DMA) controllers, multiple distinct regions of memory, and/or peripheral devices. At the same time, such computerized systems are being used to automate safety-critical tasks in many different applications and systems, including devices and vehicles, such as cars, airplanes, robots, etc.

In many scenarios, e.g., due to legacy system requirements, diverse safety needs, and the like, there may be a need for mixed safety criticality level components to be running on a system simultaneously. For example, in the automotive industry, ISO 26262 defines various level of safety, based on the severity, exposure, and controllability of potentially hazardous events. The ISO standard defines functional safety as "the absence of unreasonable risk due to hazards caused by malfunctioning behavior of electrical or electronic systems." Automotive Safety Integrity Levels, or "ASILs" establish safety requirements, e.g., based on the probability and acceptability of such potential hazards, in order for automotive components to be compliant with ISO 26262.

In particular, ISO 26262 defines four ASILs: ASIL-A, ASIL-B, ASIL-C, and ASIL-D. ASIL-A represents the lowest degree of automotive hazard, ASIL-B represents the next highest degree of hazard, ASIL-C represents the next highest degree of hazard and, finally, ASIL-D represents the highest degree of automotive hazard. Automotive systems, like airbags, brakes, and steering are examples of automotive tasks with an ASIL-D grade, while systems like power windows or rear brake lights may require only an ASIL-A grade. There is also another level of task, referred to as Quality Management or "QM" tasks. The level QM means that the risk associated with a hazardous event is not unreasonable, and, therefore, the task does not require safety measures in accordance with ISO 26262. Some systems may have components that implement multiple, different safety criticality levels, e.g., both ASIL-A and ASIL-D components.

SUMMARY

In an example, a device includes a set of primary components, a set of secondary components, and an interconnect coupled between the set of primary components and the set of secondary components. Each primary component of the set of primary components has an access identifier, among multiple access attributes, and an access attribute, among multiple access modes. Each secondary component of the set of secondary components is protected by a firewall. Each firewall is configured to specify, for each specific combination of an access identifier and access attribute, whether access to the associated secondary component is permitted and what type of access is permitted.

In another example, a device includes a set of primary components, a set of secondary components, and a firewall configured to control access by each primary component to the selectively accessible regions. Each primary component of the set of primary components has an access identifier, among multiple access identifiers, and an access attribute, among multiple access attributes. Each access identifier indicates one or more safety levels at which the corresponding primary component is allowed to operate. A first primary component of the set of primary components also has access rules. Each secondary component of the set of secondary components including at least one selectively accessible region. The access rules and firewall create a multi-level safety scheme for interaction between the first primary component and any of the secondary components. In other embodiments, each of one or more additional primary components also has access rules.

In yet other examples, methods and software-based instructions may be used to realize aspects of the functionality of various components.

BRIEF DESCRIPTION OF THE DRAWINGS

For a detailed description of various examples, reference will now be made to the accompanying drawings in which.

The same reference number is used in the drawings for the same or similar (either by function and/or structure) features.

DETAILED DESCRIPTION

When mixed safety criticality level components co-exist in a system (e.g., in the case of systems having components with three or more different ASIL levels), safety standards may require that the system implement freedom from interference (FFI) measures and rules, e.g., to prevent cascading faults from lower criticality systems from negatively affecting systems of higher criticality. Another important access protection rule for FFI measures to implement is memory read/write protection for the various components of a system. Therefore, it is desirable to have improved systems and techniques for enabling functional safety and FFI in the operation of such mixed safety criticality level systems for performing various safety-critical tasks concurrently.

Some example embodiments include an integrated circuit (IC), e.g., a system on a chip (SoC), with at least one dedicated controller configured to program various SoC components, e.g., processors, controllers, ISPs, HWA, DMA, GPUs, memory regions and/or peripherals with access control policies to enable memory access FFI rules. In some embodiments, the IC may be specifically configured to handle the use case scenario of mixed safety criticality level tasks being performed concurrently by the system.

Automotive Safety Integrity Level (ASIL) Risk Classification Scheme as Defined by ISO 26262

Figure 1:
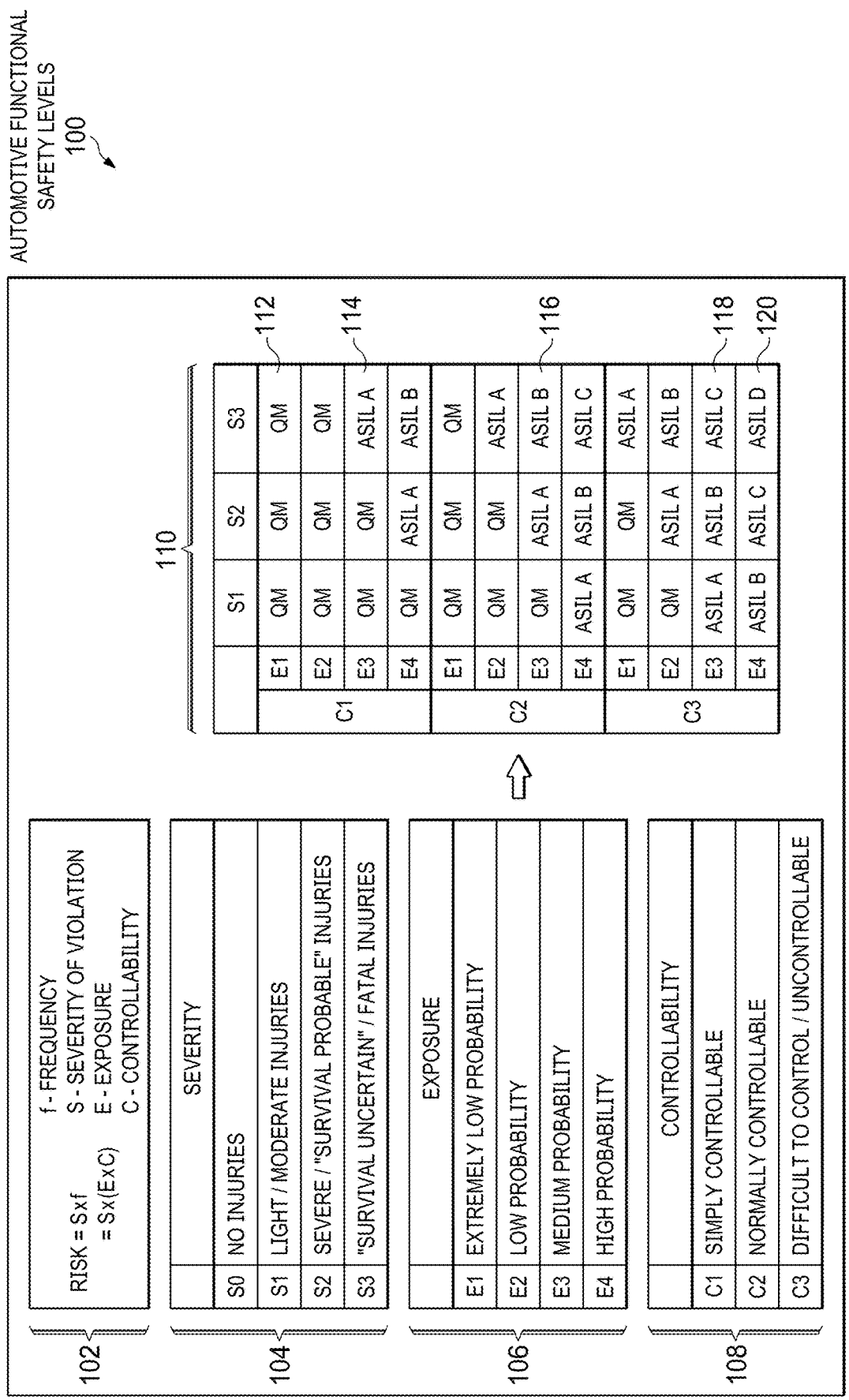
FIG. 1 illustrates a table describing the various automotive functional safety levels.

Turning now to FIG. 1, a table 110 is illustrated, describing various automotive functional safety levels 100. ISO has defined "safety" as an absence of unacceptable risk, where risk is defined as a combination of the frequency of occurrence of a harm and the severity of that harm. As shown in equation 102, in some examples, risk may be computed as a product of the severity of a violation (S) and the frequency (f) of such violation. As shown in table 104, the severity of a violation may be broken down into four levels of increasing criticality (e.g., S0=no injuries; S1=light/moderate injuries; S2=severe/"survival probable" injuries; and S3="survival uncertain"/fatal injuries).

The frequency (f) of a violation may be further broken down into a product of the exposure probability (E) and the controllability (C) of such violation. In other words, Risk=S×(E×C). As shown in table 106, the exposure probability of a violation may be broken down into four levels of increasing criticality (e.g., E1=extremely low probability; E2=low probability; E3=medium probability; and E4=high probability). As shown in table 108, the controllability of a violation may be broken down into three levels of increasing criticality (e.g., C1=simply controllable; C2=normally controllable; and C3=difficult to control/uncontrollable).

The term "functional safety" (FuSa) has been defined by ISO as an absence of unreasonable risk due to hazards caused by malfunctioning behavior of electrical/electronic systems. The Functional Safety Standard (e.g., ISO 26262 for the automotive industry) defines various level of safety based on severity and controllability. For example, as described above, ISO 26262 defines four Automotive Safety Integrity Levels (i.e., "ASILs") of increasing criticality: ASIL-A, ASIL-B, ASIL-C, and ASIL-D.

The table 110 illustrates example combinations of severity (S), exposure probability (E), and controllability (C) levels, and their resulting ASIL (or QM) attributes. (As mentioned above, Quality Management or "QM" tasks are defined as tasks wherein the risk associated with a hazardous event is not unreasonable, and, therefore, the task does not require safety measures in accordance with ISO 26262). For example, the combination 112 of C1, E1, and S3 criticality levels results in a task that may be coded with a QM attribute; the combination 114 of C1, E3, and S3 criticality levels results in a task that may be coded with an ASIL-A attribute; the combination 116 of C2, E3, and S3 criticality levels results in a task that may be coded with an ASIL-B attribute; the combination 118 of C3, E3, and S3 criticality levels results in a task that may be coded with an ASIL-C attribute; and, finally the combination 120 of C3, E4, and S3 criticality levels, i.e., the highest risk criticality levels in each category, results in a task that may be coded with an ASIL-D attribute. It is to be understood that different manufacturers may organize and/or code the combinations of safety criticality levels in different ways, resulting in different ASIL attribute combinations than are shown in example table 110. Likewise, in some implementations, it may be sufficient to collapse the safety levels into three or fewer level, e.g., combining ASIL-A and ASIL-B to all be coded as ASIL-B tasks; and combining ASIL-C and ASIL-D to all be coded as ASIL-D tasks, thereby resulting in the use of only QM, ASIL-B, and ASIL-D safety levels in a given system.

Figure 2:
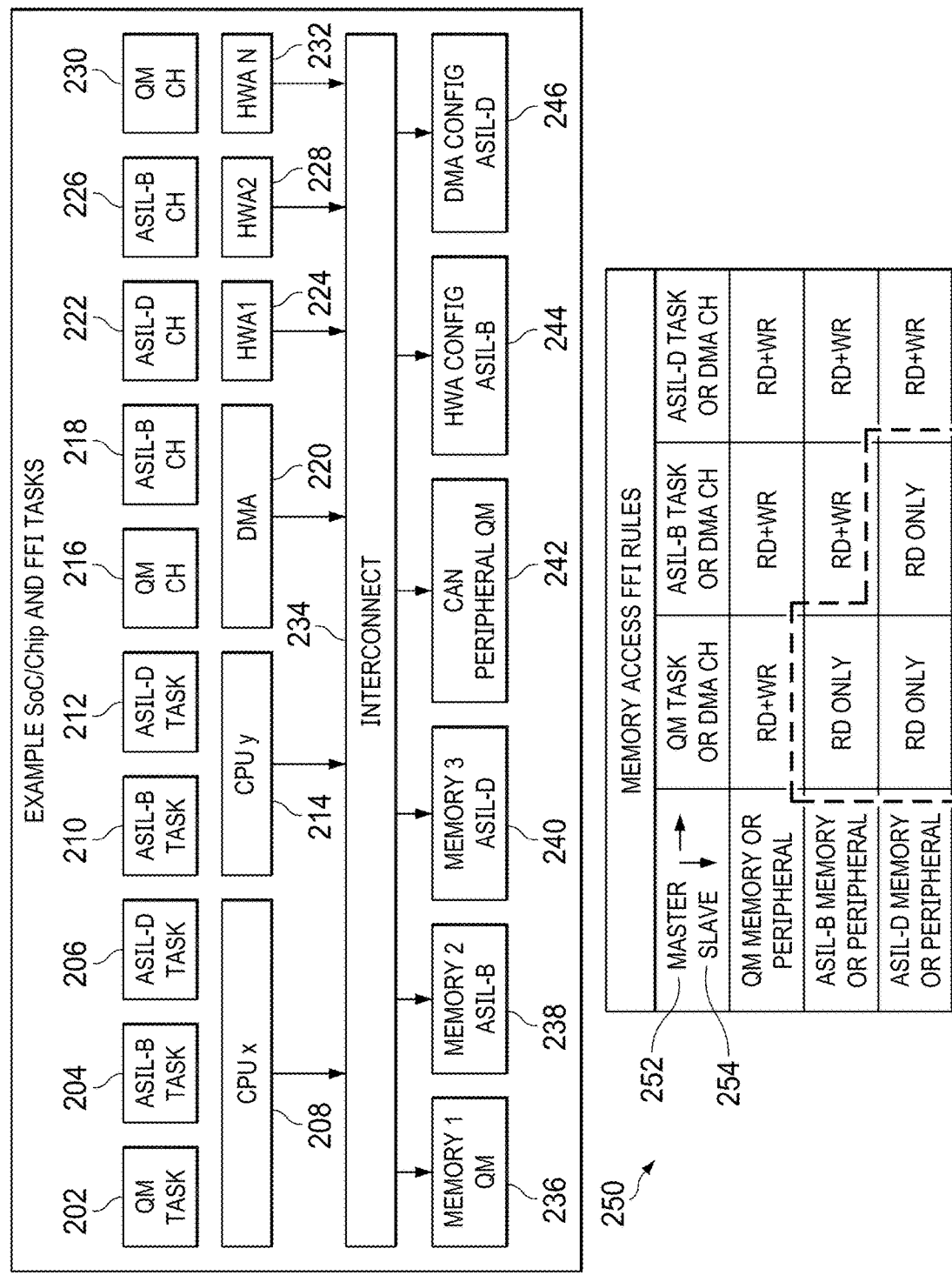
FIG. 2 illustrates a block diagram of an example system on a chip (SoC) and a table of example memory access FFI rules.

Turning now to FIG. 2, a block diagram 200 of an example system on a chip (SoC) and a table of example memory access FFI rules are illustrated. Example SoC 200 provides an example of an SoC capable of performing tasks of varying safety criticality levels. For example, a first component, CPU x (208), may be configured to perform a QM task (202), an ASIL-B task (204), and an ASIL-D task (206), while a second component, CPU y (214), may be configured to perform an ASIL-B task (210) and an ASIL-D task (212). Example SoC 200 further comprises a Direct Memory Access (DMA) controller (220), which may be configured to have a QM direct memory access channel (216) (i.e., a QM DMA channel is one that may be utilized, e.g., programmed, by a QM task) and an ASIL-B direct memory access channel (218) (i.e., an ASIL-B DMA channel is one that may be utilized, e.g., programmed, by an ASIL-B task). Example SoC 200 still further comprises a number of Hardware Accelerators (HWAs), i.e., hardware designed to perform specific functions or tasks in an efficient manner, for example, GPUs, DSPs, ISPs, FPGAs, ASICs, and the like. In the example of SoC 200, HWA 1 (224) is configured to have an ASIL-D criticality level (222), while HWA 2 (228) is configured to have an ASIL-B criticality level (226), and additional HWAs may also exist, such as HWA n (232), which is illustrated as having a QM criticality level (230).

Each of the various illustrative components of SoC 200 (e.g., 208/214/220/224/228/232) may attempt to access system memory regions and/or peripheral devices via interconnect 234, e.g., a communication bus. As with the various components of SoC 200 described above, the various system memory regions and peripheral devices may also be assigned varying safety criticality levels. For example, Memory Region 1 (236) may have a QM criticality level; Memory Region 2 (238) may have an ASIL-B criticality level; Memory Region 3 (240) may have an ASIL-D criticality level; a Controller Area Network (CAN) peripheral (242) may have a QM criticality level; there may be an HWA memory region (244) with an ASIL-B criticality level; and a DMA memory region (246) with an ASIL-D criticality level. At any point in time, each of the Master components of the SoC 200 (e.g., 208/214/220/224/228/232) may attempt to access (e.g., read from and/or write to) one or more of the Slave memory regions or peripheral devices of the SoC 200 (e.g., 236/238/240/242/244/246). In order to implement freedom from interference (FFI), whenever mixed safety criticality levels are present in the same system, a set of memory access FFI rules (e.g., as shown in example table 250) may be established, e.g., to prevent cascading faults from lower criticality systems from affecting systems of higher criticality and/or to protect memory regions from unauthorized read/write access.

As mentioned above, in some cases, for simplicity and/or ease of implementation, it may be desirable (or sufficient) to collapse the 5 available safety criticality levels into a three-tiered access system, e.g., implementing only: QM tasks, ASIL-B tasks, and ASIL-D tasks. As shown in example table 250, the columns across the top row 252 reflect the various categories of "Master" components that may be included in the system 200, i.e.: QM tasks or DMA/HWA channels, ASIL-B tasks or DMA/HWA channels, and ASIL-D tasks or DMA/HWA channels. Similarly, the rows down the left most column 254 reflect the various categories of "Slave" memory regions or peripheral devices that may be included in the system 200, i.e.: QM memory regions or peripherals, ASIL-B memory regions or peripherals, and ASIL-D memory regions or peripherals. The intersections of the so-labeled rows and columns in table 250 reflect the respective example memory access FFI rules that have been defined in the implementation illustrated in FIG. 2.

For example, according to table 250, a Master QM task (or DMA/HWA channel) may read and/or write to a Slave QM memory region or peripheral, while it may only read from higher criticality level Slave memory regions or peripherals, such as ASIL-B or ASIL-D memory regions or peripherals. Similarly, a Master ASIL-B task (or DMA/HWA channel) may read and/or write to a Slave QM or fellow ASIL-B memory region or peripheral, while it may only read from a higher ASIL-D criticality level Slave memory region or peripheral. Finally, a Master ASIL-D task (or DMA/HWA channel) may be able to read and/or write to any Slave memory region or peripheral, since this is considered the highest-possible criticality level category of task that will be executed on SoC 200.

As will be discussed in further detail below, it may also be desirable for the FFI rules to be able to handle the use case of "mixed criticality" ASIL tasks being performed on the same CPU, DMA, or HWA. For example, as described above, a Master component may be capable of executing any of the following combination of safety criticality level tasks: QM+ASIL-B; QM+ASIL-D; ASIL-B+ASIL-D, or all three critical levels defined in the examples described immediately above, that is: QM+ASIL-B+ASIL-D. Because of the size and complexity of modern SoCs, there may be a need to support up to 50-100 (or more) Master devices, as well as up to 50-100 (or more) different memory regions and/or peripherals, each with their own one or more safety criticality levels. Thus, the definition of comprehensive—and reliably enforceable—FFI rules for each possible scenario may be crucial for the implementation of functional safety, especially in automotive (or other mixed safety criticality) systems.

Figure 3:
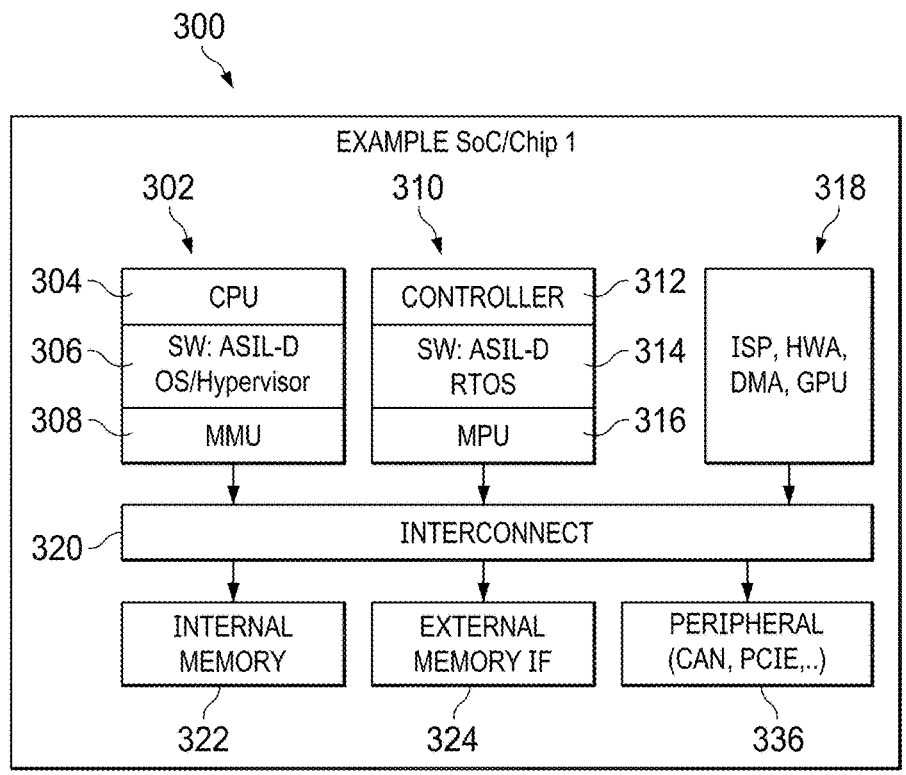
FIG. 3 illustrates a block diagram of another example SoC.

Turning now to FIG. 3, a block diagram of another example SoC 300 is illustrated. In the example illustrated in FIG. 3, FFI is implemented using a combination of Memory Management Units (MMUs) and Memory Protection Units (MPUs). MMUs are hardware units configured to handle all memory and caching operations associated with a given processor, e.g., including handling all memory references, translating virtual memory addresses to physical memory addresses, and/or determining whether particular requested data may be retrieved (or written to) RAM or ROM storage. An MPU is a hardware unit configured to provide memory protection support to a to a processor. For example, MPUs may allow sufficiently privileged software to define memory regions and assign memory access permissions and memory attributes to each memory region and/or peripheral devices connected to the system.

Returning to the example illustrated in FIG. 3, the example SoC 300, labeled "Chip 1," comprises a number of Master components (302/310/318), an interconnect component 320 (e.g., a communications bus), and a number of Slave components (322/324/336). A first Master component 302 comprises: a CPU 301, a software task 306, which, in this case, is an OS/Hypervisor program that has been categorized as having an ASIL-D safety criticality level, and an MMU 308. A second Master component 310 comprises: a controller 312, a software task 314, which, in this case, is a real-time operating system (RTOS) program that has been categorized as having an ASIL-D safety criticality level, and an MPU 316. A third Master component 318 represents an example hardware unit configured to perform particular functions and access system memory, such as an ISP, HWA, DMA, and/or GPU. Slave component 322 represents a region of internal memory on SoC 300, while Slave component 324 represents an example external memory interface (e.g., memory that is physically located off the SoC 300 chip), and Slave 336 represents an example peripheral device that may be connected to SoC 300 (e.g., devices implementing the CAN bus protocol, devices connected via Peripheral Component Interconnect Express (PCIE), etc.).

In the example SoC 300, each software component (or task) may be configured with an MMU translation table or MPU region table specifying read/write access attributes based on FFI rules. For example, as explained above with reference to table 250, in some embodiments, QM software tasks will not be given access to write data in areas of ASIL-B or ASIL-D memory, and so on. The programming of the MMU and MPU may be performed by an appropriately authorized software application, e.g., an OS/Hypervisor or a RTOS.

One drawback to the memory access protection scheme of example SoC 300 shown in FIG. 3 is that it may not be employed on Master components, such as those shown at 318, e.g., ISPs, HWA, DMA, GPUs and/or any other devices that don't have MMUs or MPUs, which is often the case, e.g., due to limited area, costs, or latency constraints of such components. Even for some Master components, such as those shown at 310, mixed criticality FFI rules may only be partially enforceable, e.g., due to the fact that the controller's MPU (e.g., 316 in FIG. 3) may have a very limited number of programmable memory protection regions (e.g., approximately 10), so the system would not be able to protect and enforce region-specific FFI rules for the greater numbers (e.g., 50-100) of slave devices that may be present in modern systems and SoCs. Additionally, the programming of the MMU/MPU must be done in the highest ASIL level supported by the system, e.g., ASIL-D. This may require that the SoC's OS/Hypervisor/RTOS (i.e., whichever software is programming the MMU/MPU) be ASIL-D rated, thereby raising the device cost and increasing the amount of effort needed to program and operate the software significantly.

Figure 4:
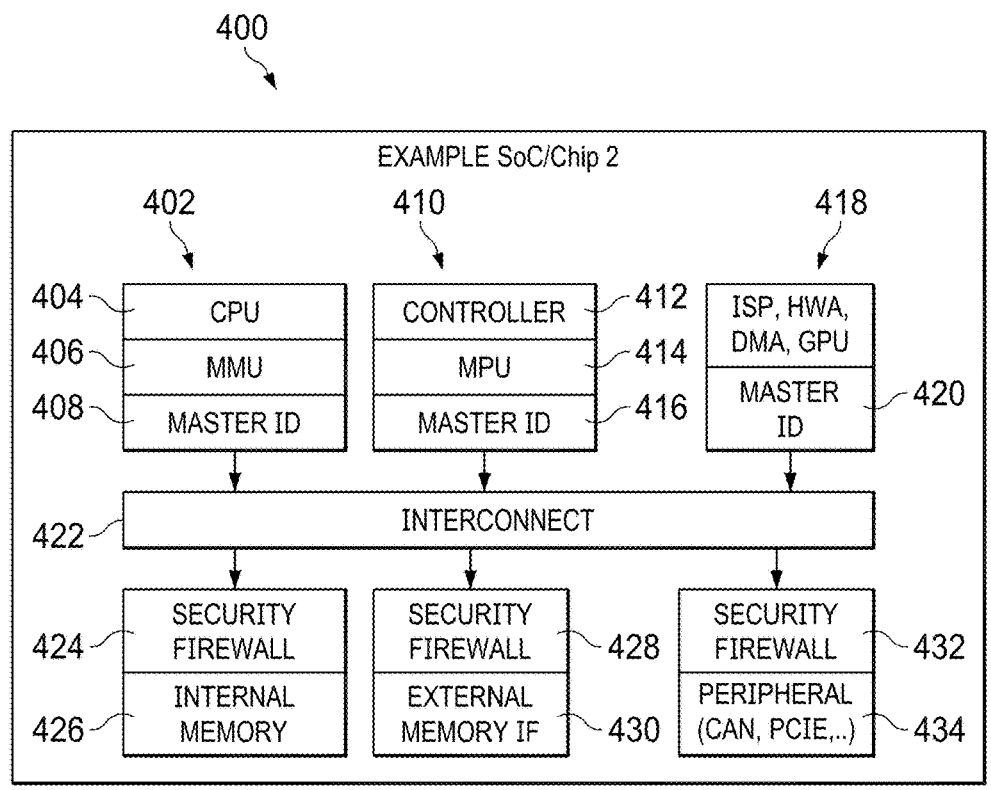
FIG. 4 illustrates a block diagram of yet another example SoC.

Turning now to FIG. 4, a block diagram of yet another example SoC 400 is illustrated. In the example illustrated in FIG. 4, FFI is implemented using a combination of MMUs, MPUs, and Master IDs. Master IDs may be unique, hardwired numbers (i.e., not changeable by software) that are assigned to every Master instance on the SoC at design time. In FIG. 4, the example SoC 400, labeled "Chip 2," comprises a number of Master components (402/410/418), an interconnect component 422 (e.g., a communications bus), and a number of Slave components (426/430/434). A first Master component 402 comprises: a CPU 404, an MMU 406, and a Master ID 408 hardwired for the component 402. A second Master component 410 comprises: a controller 412, an MPU 414, and a Master ID 416 hardwired for the component 410. A third Master component 418 represents an example hardware unit configured to perform particular functions and access system memory, such as an ISP, HWA, DMA, and/or GPU, and also is assigned an example hardwired Master ID 420. Slave component 426 represents a region of internal memory on SoC 400 and is protected by a first security firewall 424, while Slave component 430 represents an example external memory interface (e.g., memory that is physically located off the SoC 400 chip) and is protected by a second security firewall 428, and Slave 434 represents an example peripheral device that may be connected to SoC 400 (e.g., devices implementing the CAN bus protocol, devices connected via PCIE, etc.) and is protected by a third security firewall 432.

In the example SoC 400, each security firewall (e.g., 424/428/432) provides read/write access to its corresponding memory region or peripheral device. The protection may be specified for multiple access modes, e.g., a "user" mode, which may have limited or read-only access, and a "supervisor" mode, which may have full access and read/write capabilities to the respective memory region or peripheral device. In example SoC 400, each security firewall (e.g., 424/428/432) may be programmed to specifically handle several specific Master IDs or groups thereof. However, as stated above, the Master IDs and/or groupings in systems such as SoC 400 may be hardwired for security and not changeable by software, while the individual programming of the security firewall components may be performed by either an OS/Hypervisor or an RTOS.

Some drawbacks to the memory access protection scheme of example SoC 400 shown in FIG. 4 include the fact that it may not be employed on Master components, such as those shown at 418, e.g., ISPs, HWA, DMA, GPUs, as they either don't have or can't drive user/supervisor signals on the SoC to indicate the access levels to a security firewall. In case of MPUs (e.g., 414), the frequency of change between "user" and "supervisor" access modes, e.g., via a cache flush operation, can lead to poor software performance, e.g., due to the additional CPU cycles required to fill the cache again with the new task data. Further, some example security firewalls can only support very limited numbers of different Master IDs (e.g., only 2 or 3), while modern SoCs may have up to hundreds of Master devices with unique Master IDs. The use of a Master ID lookup process by a firewall also may also take multiple clock cycles to complete because the firewall may have to search through hundreds (or more) items in a log book to see if the current Master ID it is looking for is present. This can add to system latency, so there may be only a finite rule set (e.g., a maximum of 3 rules for a firewall), otherwise the memory accesses will be too delayed for real-time operations.

To accommodate these limitations, the grouping of Masters (e.g., based on the IDs' least significant bit (LSB)) may be decided beforehand, during the silicon design stage. As such, larger numbers of Master components cannot often be adequately divided into such a small number of groups (e.g., only 2 or 3), thereby making the entire safety scheme limited. Finally, in many examples, the programming of the firewall components must be done in the highest ASIL level supported by the system, e.g., ASIL-D. This means that the SoC's OS/Hypervisor/RTOS (i.e., whichever software is programming the firewalls) needs to be ASIL-D rated, thereby raising the device cost and increasing the amount of effort needed to program and operate the software significantly.

Improved Mixed Safety Criticality Level Systems for Functional Safety and Freedom from Interference (FFI)

Figure 5:
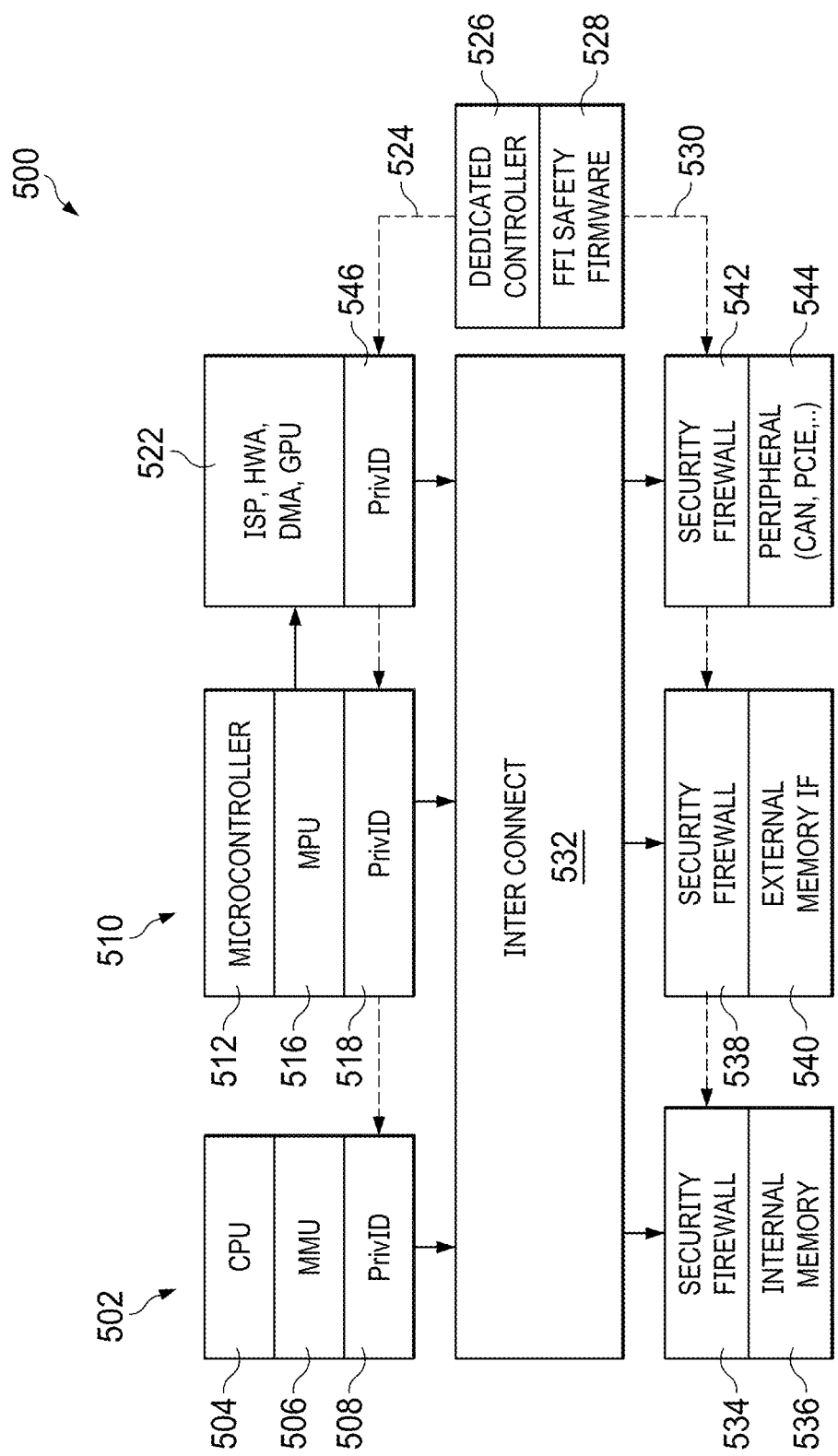
FIG. 5 illustrates a block diagram of an example SoC for enabling FFI in a mixed safety criticality level system, in accordance with aspects of the present disclosure.

Turning now to FIG. 5, a block diagram of an example SoC 500 for enabling FFI in a mixed safety criticality level system is illustrated, in accordance with aspects of the present disclosure. The example SoC 500 illustrated in FIG. 5 provides a solution to the aforementioned mixed criticality FFI system drawbacks via a combination of "Master-side" and "Slave-side" enhancements, which will now be discussed in greater detail. In the example illustrated in FIG. 5, FFI is implemented using a combination of MMUs, MPUs, security firewalls and safety privilege access IDs (also referred to herein as "PrivIDs" or "Safety Access IDs"). PrivIDs may comprise software-programmable numbers (i.e., changeable by software) that are assigned to every Master on the SoC. PrivIDs may be a set number of bits, e.g., 8 bits, each, and can be any number desired, i.e., they do not have to be numbers specifically related to anything about the particular Master they are being assigned to. Each Master may also have one or more programmed access attributes (e.g., the aforementioned "user" attribute or "supervisor" attribute, a "secure" or "non-secure" mode attribute, and the like). While a CPU may have the ability to generate access attributes based on the CPU execution state itself, other Master devices such as some HWAs may not be able to generate access attributes on their own and, thus, according to embodiments disclosed herein, a dedicated controller hardware unit component 526 may use firmware 528 to program the appropriate access attributes for a given Master device. Neither CPUs nor HWA can generate PrivIDs on their own, hence the dedicated controller hardware unit 526 may also use firmware 528 to program PrivIDs into CPUs (e.g., PrivID 508), microcontrollers (e.g., PrivID 518), or HWA (e.g., PrivID 546). In some implementations, all PrivID and access attribute programming and configuration may happen prior to the start of any particular use case—but are not hardwired at design time.

In FIG. 5, the example SoC 500 comprises a number of Master components (502/510/522), an interconnect component 532 (e.g., communications bus), and a number of Slave components (536/540/544), and a dedicated controller hardware unit 526. A first Master component 502 comprises: a CPU 504, an MMU 506, and a PrivID 508 programmed into a memory of the component 502. A second Master component 510 comprises: a microcontroller 512, an MPU 516, and a PrivID 518 programmed into a memory of the component 510. A third Master component 522 represents an example hardware unit configured to perform particular functions and access system memory, such as an ISP, HWA, DMA, and/or GPU, and may be programmed with access attributes and/or exemplary PrivID 546, as described above. Slave component 536 represents a region of internal memory on SoC 500 and is protected by a first security firewall 534 (which will be described in more detail below), while Slave component 540 represents an example external memory interface (e.g., memory that is physically located off the SoC 500 chip) and is protected by a second security firewall 538, and Slave component 544 represents an example peripheral device that may be connected to SoC 500 (e.g., devices implementing the CAN bus protocol, devices connected via PCIE, etc.) and is protected by a third security firewall 542.

In the example SoC 500, each security firewall (e.g., 534/538/542) provides read/write access to its corresponding memory region or peripheral device. The security firewalls may comprise one or more of: a peripheral Firewall (FW) (e.g., a Universal Asynchronous Receiver/Transmitter (UART), a Serial Peripheral Interface (SPI), CAN, etc.); a channelized firewall (CH-FW) (e.g., a DMA CH configuration); or a memory firewall (M-FW) (e.g., for protecting internal and external memory). The protection may be specified for multiple combinations of PrivIDs and access modes (e.g., a "user" mode, which may have limited or read-only access, and a "supervisor" mode, which may have full access and read/write capabilities) and the safety criticality levels of the respective memory region or peripheral device that another device or software task is attempting to access.

In example SoC 500, each security firewall (e.g., 534/538/542) may be programmed to specifically handle several software-programmable Master IDs (e.g., to enable 3-level FFI) or groups thereof. The individual programming of component PrivIDs (indicated by dashed arrow line 524), the MMUs, MPUs, and the security firewall components (indicated by dashed arrow line 530) may be performed by a dedicated hardware controller 526 on the SoC 500, executing FFI safety firmware 528, which is configured to program and enable the multi-level FFI schemes described herein, based on desired FFI rule mappings for a given implementation.

Figure 6:
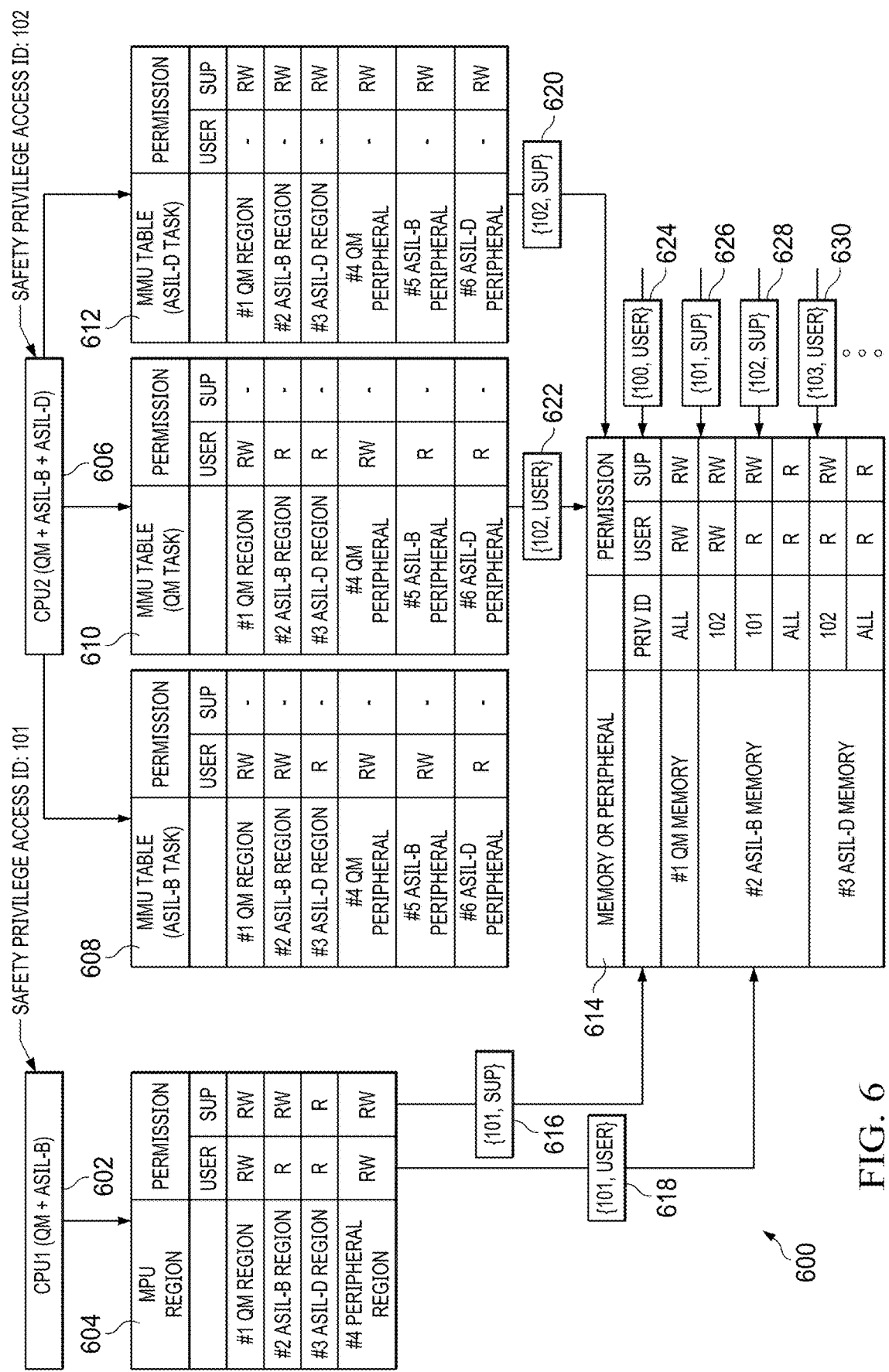
FIG. 6 illustrates a block diagram of various components of an example SoC for enabling FFI in a mixed safety criticality level system, in accordance with aspects of the present disclosure.

Turning now to FIG. 6, a block diagram of various components of an example SoC 600 for enabling FFI in a mixed safety criticality level system is illustrated, in accordance with aspects of the present disclosure. Example SoC 600 comprises a first Master 602, labeled CPU1, and a second Master 606, labeled CPU2. In this example, CPU1 is configured to execute transaction requests generated by software tasks having either QM or ASIL-B safety criticality levels, while CPU2 is configured to execute transaction requests generated by software tasks having any of a QM, ASIL-B, or ASIL-D safety criticality level.

As described above, to help enforce a multi-tiered mixed safety criticality FFI scheme, each Master may be programmed with a PrivID, e.g., by a dedicated controller. In some cases, the PrivID may be unique to each Master in the SoC. However, in other cases, it may be more efficient to program similar Master components with the same PrivID. For example, all CPUs approved for ASIL-B safety criticality levels (such as CPU1 602) could be assigned a PrivID value of '101,' while all CPUs approved to execute transaction requests generated by software tasks having any of a QM, ASIL-B, or ASIL-D safety criticality level (such as CPU2 606) could be assigned a PrivID value of '102,' and so forth. It is to be understood that other PrivIDs could also be used in a given implementation. In some implementations, for example, in order to balance memory access times and efficiency in implementing the FFI rules, a maximum of three different PrivIDs may be used for a particular SoC.

Looking further at CPU1 602, an MPU region table 604 is shown, which may be programmed with various memory access rules, depending on the access attribute/permission setting of a given task and the ASIL of the memory region or peripheral the given task may be attempting to access. For example, as shown in MPU region table 604, a task running with a "user" mode permission attribute may have permission to: read/write into a QM memory region or a peripheral; and only read from an ASIL-B or ASIL-D memory region. Conversely, as is also shown in MPU region table 604, a task running with a "supervisor" mode permission attribute may have permission to: read/write into a QM memory region, ASIL-B memory region, or a peripheral; and only read from an ASIL-D memory region (e.g., write operations to the ASIL-D region may be strictly prohibited, since it is known that CPU1 is not itself even configured to be able to execute ASIL-D tasks). In its simplest form, the access attribute may be a single bit that is set, e.g., a '0' value to indicate user mode and a '1' value to indicate supervisor mode, though other signaling schemes for the access mode attribute are also possible. In some implementations, the number of MPU entries available may be quite limited, e.g., allowing only 4 or 8 or 16 distinct entries in the MPU table.

By each Master component sending the combinations of PrivID and access permission attributes to an security firewall of a Slave component (e.g., security firewall 614 in FIG. 6), the SoC 600 can meet and enforce the desired three-level (or more) FFI rule scheme in an efficient and predictable manner. An MPU with only user/supervisor access mode settings provides two-level FFI, e.g., upon a CPU switching between such access modes. However, to achieve three-level FFI, the systems described herein may intentionally allocate ASIL-D tasks to use supervisor mode only and allocate QM and ASIL-B tasks to use user mode only. In such cases, when a task switch occurs to a QM or ASIL-B task, the system may also switch the MPU table used as well, e.g., as shown in the below pseudocode:

```
task_switch(cur_task, next_task)
{
    // enter ASIL-D mode for task switching
    CPU_switchMode(SUPERVISOR);
    if( (next_task->asil is QM or ASILB) AND
        (cur_task->asil != next_task->asil) )
        // switch MPU if switching to QM or ASILB
        // switch MPU table only if it does not violate FFI rules
        if(MPU_isValid(next_task->MPU_table))
            CACHE_flush( ) // clear cache
            MPU_disable( ) // disable MPU
            MPU_program(next_task->MPU_table) // switch MPU
            MPU_enable( ) // reenable MPU
    if(next_task->asil is QM or ASILB)
        CPU_switchMode(USER);
}
```

As mentioned above, in three-level FFI being implemented with an MPU, the MPU may be used to enforce FFI between QM and ASIL-B tasks. However, MPU regions may be limited in number and may not support the granularity of MMU table regions. Hence, one solution is that ASIL-B level tasks can program peripherals directly, since FFI rules can be applied with the firewall set to "user" access, and ASIL-D mode may be used when programming such peripherals for QM tasks, as shown in the below pseudocode:

```
program_hw(hw_config)
{
    if(cur_task->asil is QM)
        // switch to ASIL-D for peripheral programming
        // for QM
        CPU_switchMode(SUPERVISOR)
        // program HW if it does not violate FFI rules
        if(is_valid_hw_config(hw_config))
            do_program_hw(hw_config)
        CPU_switchMode(USER); // switch back to QM mode
}
```

Turning now to the evaluation of an example access request, access request 616 specifies a two-entry tuple containing the values: {101, Sup}, indicating that a Master component having a PrivID of 101, while executing in Supervisor Mode, is attempting to access a region in memory or a peripheral device being protected by an security firewall 614. In order to demonstrate the application of the safety rules programmed into a memory access table of security firewall 614, the access request 616, containing the values: {101, Sup}, will now be evaluated against the various types of memory regions or peripherals that may be protected by firewall 614. For example, if access request 616 was attempting to access a QM memory region, because firewall 614 has programmed a single "all"-type or "wildcard" PrivID rule, the same access rules would be applied to transaction requests generated by any Master component attempting to access a QM memory region, i.e., the task would be permitted full read/write access (i.e., represented by "RW" in table 614), whether executing in user mode or supervisor mode. Moving down the firewall 614 memory access table rules, if access request 616 was attempting to access an ASIL-B memory region, because firewall 614 has programmed a specific memory access rule for PrivID 101, that is the rule that would be applied to access request 616 (i.e., the task would be permitted full read/write access, since it was executing in a supervisor mode, but would have been permitted only read access if it was executing in a user mode). Moving down the firewall 614 memory access rules table, if access request 616 was attempting to access an ASIL-D memory region, because firewall 614 does not have a specific memory access rule programmed for PrivID 101, again, the "all" or "wildcard" PrivID rule that is the rule that would be applied to access request 616 (i.e., the task would be permitted only read access, i.e., represented by "R" in table 614, whether it was executing in a supervisor mode or a user mode).

Access request 618 specifies the tuple values: {101, User}, and will be evaluated according to the same memory access rules programmed into firewall 614. As described above, one illustrative difference between the treatment of access request 616 and access request 618, is that, if attempting to access an ASIL-B memory region, access request 616 (having a supervisor mode access attribute) would be permitted read/write access, while access request 618 (having a user mode access attribute) would be permitted only read access.

Looking further at CPU2 606, various MMU tables 608/610/612 are shown, which may be programmed with various memory access rules, depending on the access attribute/permission setting of a given task and ASIL of the memory region or peripheral a transaction request generated by the given task may be attempting to access. For example, as shown in MMU table 608, an ASIL-B task running with a "user" mode permission attribute may have permission to: read/write into a QM memory region/peripheral or an ASIL-B memory region/peripheral; and only read from an ASIL-D memory region/peripheral. As shown in MMU table 610, a QM task running with a "user" mode permission attribute may have permission to: read/write into a QM memory region/peripheral; and only read from an ASIL B or ASIL-D memory region/peripheral. Finally, as shown in MMU table 612, an ASIL-D task running with a "supervisor" mode permission attribute may have permission to: read/write into any of a QM memory region/peripheral; an ASIL B memory region/peripheral; or an ASIL-D memory region/peripheral. As may be understood, when an MMU is present in a system, the system may not be able to operate in a truly real-time fashion, because the full look up in the MMU table takes at least some time to perform. It is also noted that HWA components may be very high throughput compared to a CPU, so it may not be desirable to not even include an MMU on an HWA component in a system.

Similar to example access requests 616 and 618 described above, example access request 620 generated by CPU 2 606 will specify the tuple values: {102, Sup}, and will be evaluated against the various types of memory regions or peripherals that may be protected by firewall 614. For example, if access request 620 was attempting to access a QM memory region, because firewall 614 has programmed a single "all"-type or "wildcard" PrivID rule, the same access rules would be applied to any Master component attempting to access a QM memory region, i.e., the task would be permitted full read/write access, whether executing an user mode or supervisor mode. Moving down the firewall 614 memory access rules table, if access request 620 was attempting to access an ASIL-B memory region, because firewall 614 has programmed a specific memory access rule for PrivID 102, that is the rule that would be applied to access request 620 (i.e., the task would be permitted full read/write access, since it was executing in a supervisor mode, and would also have been permitted full read/write access if it was executing in a user mode). Moving down the firewall 614 memory access rules table, if access request 620 was attempting to access an ASIL-D memory region, because firewall 614 has programmed a specific memory access rule for PrivID 102, that is the rule that would be applied to access request 620 (i.e., the task would be permitted full read/write access, since it was executing in a supervisor mode, but would only be permitted read access if it was executing in a user mode, as would be the case with example access request 622 generated by CPU 2 606 with the tuple values: {102, User}).

Thus, as may now be understood, the use of MMUs/MPUs provides a system with a first level protection for FFI, however, even if that level of protection fails (or cannot provide sufficient protection, e.g., as in the case of peripherals), the use of a PrivID with security firewalls as discussed herein maintains at least two levels of protection for FFI in the SoC. In other words, the MMU/MPU may be programmed by software that itself may not be in the highest ASIL category, and therefore it can make a mistake. The PrivID, on the other hand, is a one-time identifier, e.g., programmed by aforementioned elements 526/528, and thus can be trusted to be safe.

Other types of Master components may also attempt to access the memory region or peripheral device protected by firewall 614. For example, access request 624 represents a CPU or DMA Master component that is configured to execute software tasks only with a QM safety level, thus being assigned the tuple: {100, User}, wherein a PrivID of '100' may have been defined in the system for components configured to execute only software tasks having a QM safety criticality level. The access request 624 would then be evaluated against the memory access rules stored in firewall 614, as described above. For example, in this instance, there do not appear to be any rows explicitly programmed into the firewall for software tasks having the PrivID of 100, so the "all" or "wild card" PrivID rule is the rule that would be applied to access request 624 for any type of memory region or peripheral device to which access is requested.

Access request 626 may represent another CPU or DMA Master having PrivID='101' and a supervisor access mode attribute (and, thus, would be evaluated by the firewall 614 similarly to access request 616, even if access request 626 represented a completely different software task running on a different CPU or accessed via a different DMA controller). Similarly, access request 628 may represent another CPU or DMA Master having PrivID='102' and a supervisor access mode attribute (and, thus, would be evaluated by the firewall 614 similarly to access request 620, even if access request 628 represented a completely different software task running on a different CPU or accessed via a different DMA controller).

Finally, access request 630 may represent another CPU or DMA Master component that is configured to execute software tasks with yet another combination of mixed safety criticality levels, e.g., QM+ASIL-D safety levels, say, thus being assigned the tuple: {103, User}, wherein a PrivID of '103' may have been defined in the system for components configured to execute only software tasks having a QM or ASIL-D safety criticality level. Again, a given firewall may be programmed (e.g., by the FFI safety firmware 528 executing on dedicated controller 526), to have specific memory and peripheral access rules for tasks having a PrivID of '103.' If no specific rules are programmed into the firewall for this PrivID, then the "all" or "wild card" PrivID rule may be applied to access request, based on the type of memory region or peripheral device to which access is requested.

As may now be more fully appreciated, the use of a combination of Master-side protections (e.g., using MPU, MMU, and/PrivIDs), as well as Slave-side protections (e.g., via security firewalls), allows the systems described herein to support multiple levels (e.g., up to 3 levels) of mixed safety criticality FFI use cases, per Master/Slave combination. Moreover, a dedicated controller, executing intelligent FFI firmware may be used to program PrivIDs and/or access attributes into all hardware components of the SoC, thereby overcoming prior art limitations related to the hardwiring of Master IDs of hardware components at design time, and the limitations related thereto.

Additionally, ISPs, HWA, DMA, and GPUs may generate software-programmable access attributes for every transaction request, which may also be evaluated by the security firewalls described herein. The software-enabled enhancements described herein for hardware components with MPUs/MMUs allow for the support of 3-level (or more) mixed criticality FFI, while being able to support a larger number of Slave devices (e.g., up to hundreds of devices), via the use of a task switch handler in the RTOS (e.g., a software component that may be invoked by a CPU when the CPU needs to temporarily pause a currently running task and replace it with a new task that is ready for execution, and which may be configured to change CPU modes between "user" and/or "supervisor" tasks and utilize the appropriate MMU table for the evaluation of the current task)—all with very low overheads. Finally, the embodiments described herein support the safe configuration and programming of multiple safety levels of requesting components (e.g., QM, ASIL-B, ASIL-D, etc.) using a common component having an ASIL-D safety level (e.g., the aforementioned elements 526/528).

Figure 7:
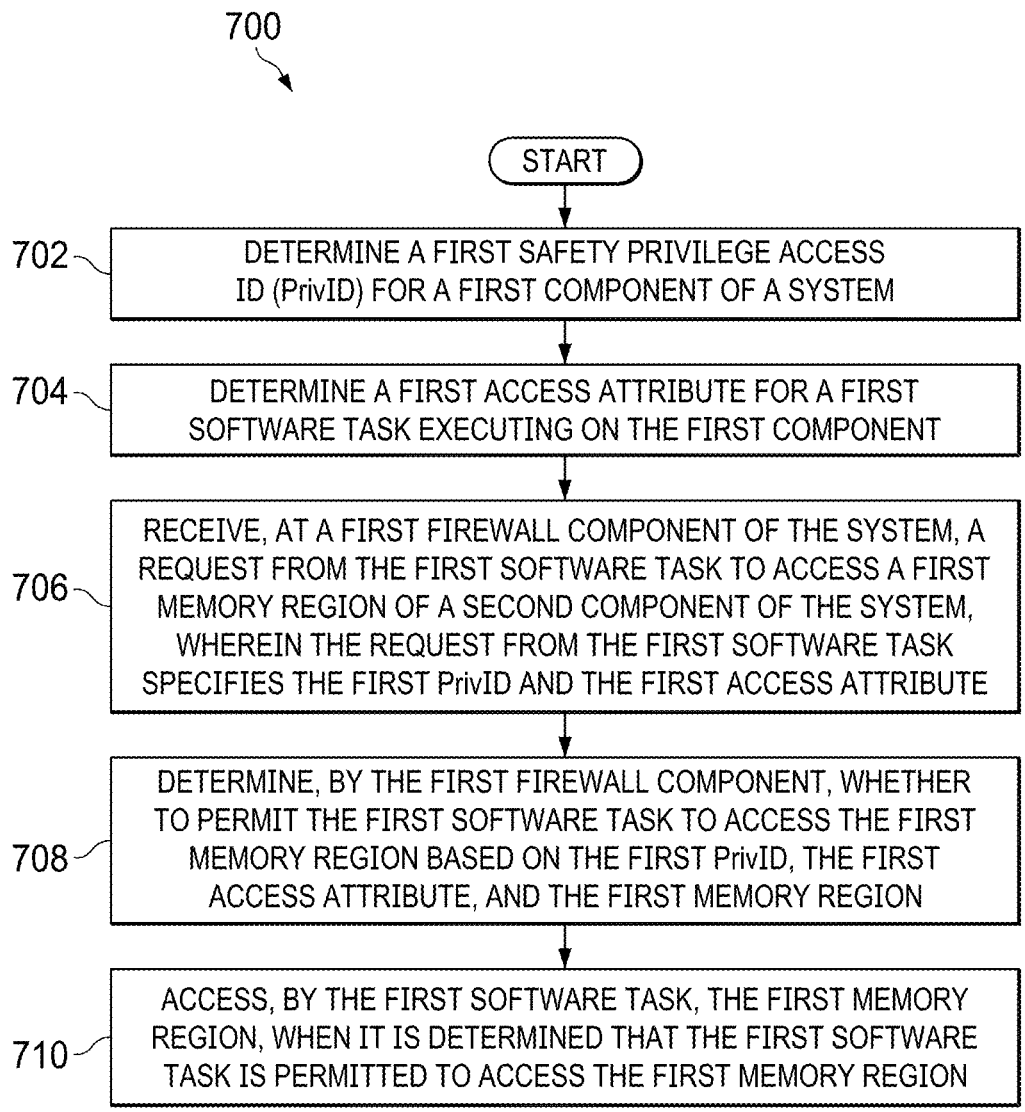
FIG. 7 is a flowchart illustrating a technique for enabling functional safety and FFI, in accordance with aspects of the present disclosure.

Methods of Enforcing Improved Functional Safety and FFI in Mixed Safety Criticality Level Systems Turning now to FIG. 7, a flowchart of a method 700 is shown, illustrating a technique for enabling functional safety and FFI, in accordance with aspects of the present disclosure. First, at Step 702, the method 700 may determine, e.g., by a controller operating on a system, a first safety privilege access ID (PrivID) for a first component of the system. Next, at Step 704, the method 700 may determine a first access attribute for a first software task executing on the first component (e.g., a "user" attribute or a "supervisor" attribute, as described above). Next at Step 706, the method 700 may receive, at a first firewall component of the system, a request from the first software task to access a first memory region of a second component of the system, wherein the request from the first software task specifies the first PrivID and the first access attribute.

At Step 708, the method 700 may then determine, by the first firewall component, whether to permit the first software task to access the first memory region based on the first PrivID, the first access attribute, and the first memory region (and, in particular, the ASIL level of the first memory region that the first software task is attempting to access).

Depending on the evaluation performed at Step 708, the method 700 may, at Step 710, allow access (e.g., write access permission), by the first software task, to the first memory region, when it is determined that the first software task is permitted to access the first memory region. Although not explicitly illustrated, it is to be understood that method 700 may block access (e.g., write access permission), by the first software task, to the first memory region, when it is determined that the first software task is not permitted to access the first memory region.

Figure 8:
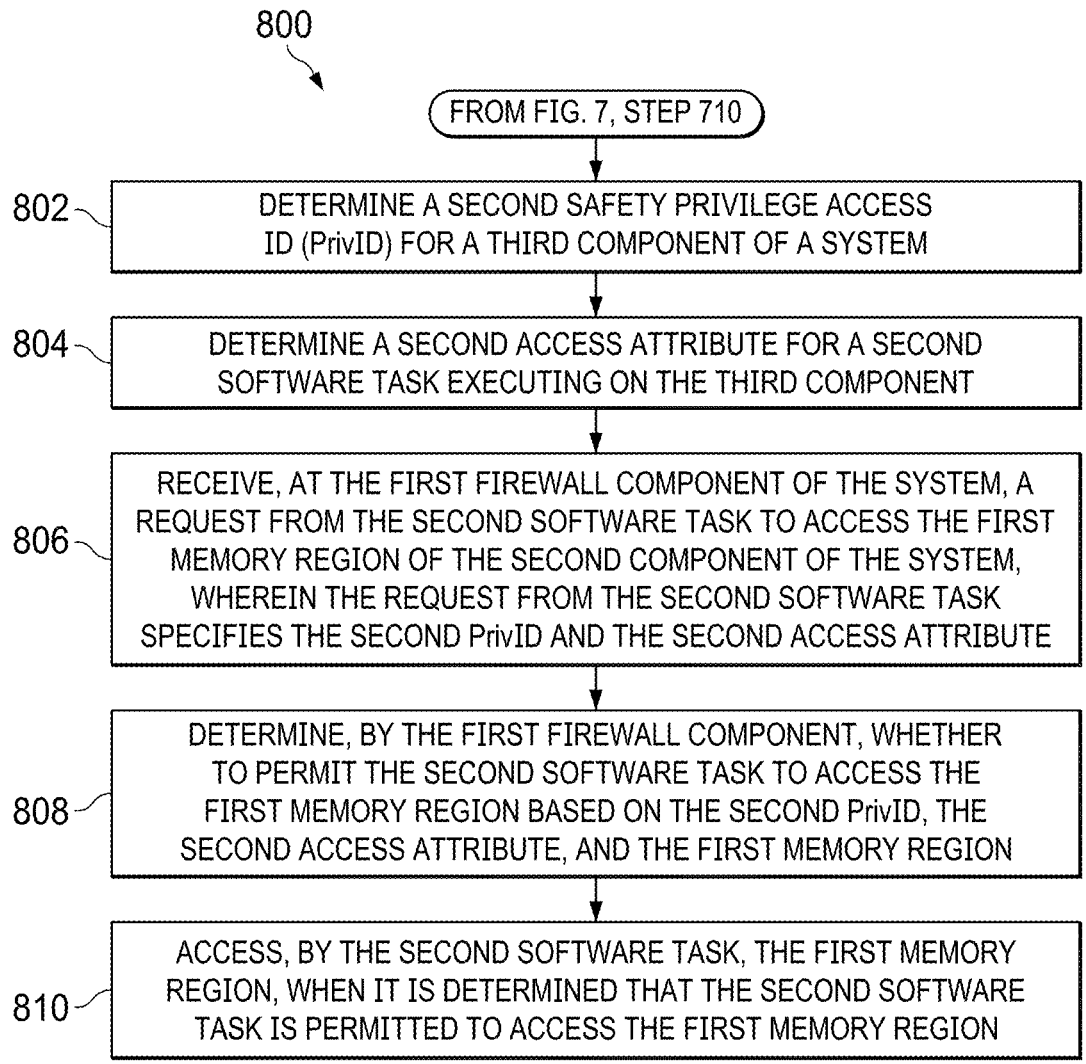
FIG. 8 is a flowchart illustrating another technique for enabling functional safety and FFI, in accordance with aspects of the present disclosure.

Turning now to FIG. 8, a flowchart of a method 800 is shown, illustrating another technique for enabling functional safety and FFI, in accordance with aspects of the present disclosure. Method 800 details the scenario wherein a different system component (e.g., having a different assigned PrivID) than the first component discussed above with reference to method 700 attempts to access the same first region of memory and may be met with a different result, depending on the specification of the applicable permission setting in the first firewall component.

First, and optionally following the completion of Step 710 of method 700, at Step 802, the method 800 may determine a second PrivID for a third component of the system. Next, at Step 804, the method 800 may determine a second access attribute for a second software task executing on the third component (e.g., a "user" attribute or a "supervisor" attribute, as described above, though for a different software task than described above in method 700). Next at Step 806, the method 800 may receive, at the first firewall component of the system, a request from the second software task to access the first memory region of the second component of the system, wherein the request from the second software task specifies the second PrivID and the second access attribute.

At Step 808, the method 800 may then again determine, by the first firewall component, whether to permit the second software task to access the first memory region based on the second PrivID, the second access attribute, and the first memory region (and, in particular, the ASIL level of the first memory region that the second software task is attempting to access).

Depending on the evaluation performed at Step 808, the method 800 may, at Step 810, allow access, by the second software task, to the first memory region, when it is determined that the second software task is permitted to access the first memory region. Although not explicitly illustrated, it is to be understood that method 800 may block access, by the second software task, to the first memory region, when it is determined that the second software task is not permitted to access the first memory region. It is further to be understood that, depending on the particular permission settings programmed into the first firewall component, different software tasks, being executed by different system components, may be permitted different levels of access to system memory or peripherals—even if attempting to access the same memory region of the same memory or peripheral.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

Circuits described herein are reconfigurable to include additional or different components to provide functionality at least partially similar to functionality available prior to the component replacement. Modifications are possible in the described examples and embodiments, and other examples and embodiments are possible within the scope of the claims.

What is claimed is:

1. A device comprising:
    a set of primary components, each primary component of the set of primary components having an access identifier, among multiple access identifiers, and an access attribute, among multiple access attributes;
    a set of secondary components, each secondary component of the set of secondary components protected by a firewall; and
    an interconnect coupled between the set of primary components and the set of secondary components;
    wherein each firewall is configured to specify, for each specific combination of an access identifier and access attribute, whether access to the associated secondary component is permitted and what type of access is permitted.

2. The device of claim 1, wherein the access identifiers are programmable.

3. The device of claim 1, wherein the access attributes include a user-mode and a supervisor-mode.

4. The device of claim 1, wherein the set of secondary components includes a region of internal memory of the device, an interface configured to communicate with an external memory, and a peripheral device.

5. The device of claim 1, wherein the type of access includes a read/write access, a write-only access, and a read-only access.

6. The device of claim 1, further comprising a controller configured to program the access identifier for each primary component of the set of primary components.

7. The device of claim 6, wherein the controller is further configured to program the firewall for each secondary component of the set of secondary components.

8. The device of claim 7, wherein programming of the firewalls is based on ISO 26262 for a mixed safety criticality level system.

9. The device of claim 1, wherein a first primary component of the set of primary components includes a central processing unit (CPU), a second primary component of the set of primary components includes a microcontroller, and a third primary component of the set of primary components includes a hardware accelerator.

10. The device of claim 9, wherein the first primary component further includes a memory management unit (MMU), and the second primary component further includes a memory protection unit (MPU).

11. A device comprising:
    a set of primary components, each primary component of the set of primary components having an access identifier, among multiple access identifiers, and an access attribute, among multiple access attributes, each access identifier indicating one or more safety levels at which the corresponding primary component is allowed to operate, the set of primary components including a first primary component having access rules; and
    a set of secondary components coupled to the set of primary components, each secondary component of the set of secondary components including at least one selectively accessible region; and
    a firewall configured to control access by each primary component to the selectively accessible regions.

12. The device of claim 11, wherein the safety levels include Automotive Safety Integrity Levels (ASILs) defined by ISO 26262.

13. The device of claim 11, wherein the access rules of the first primary component are configured to identify a type of access allowed for each of one or more selectively accessible regions of the set of secondary components based on the access attribute of the first primary component.

14. The device of claim 13, wherein the firewall is configured to identify a type of access allowed for each of the one or more selectively accessible regions for each combination of an access identifier and an access attribute.

15. The device of claim 14, wherein the type of access includes a read/write access, a write-only access, and a read-only access.

16. The device of claim 11, wherein the firewall includes a set of firewalls, one for each secondary component of the set of secondary components, in which each firewall of the set of firewalls is configured to control access by each primary component to the at least one selectively accessible region of the corresponding secondary component.

17. The device of claim 11, wherein the firewall is programmable.

18. The device of claim 11, wherein the firewall is configured to receive access requests from each of the primary components, in which each access request includes the access identifier and the access attribute of the corresponding primary component making the access request.

19. The device of claim 11, wherein a second primary component of the set of primary components includes access rules for each safety level at which the second primary component is allowed to operate.

20. The device of claim 19, the first primary component is a first central processing unit (CPU) and the second primary component is a second CPU.

* * * * *